Feb. 16, 1971  B. V. DELTOUR  3,563,090
DROP MONITOR
Filed Sept. 18, 1968
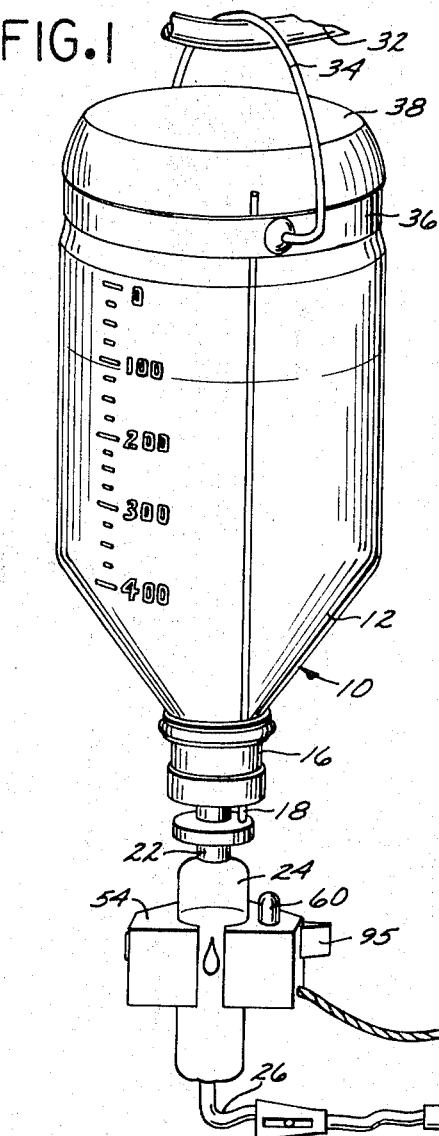
FIG.1
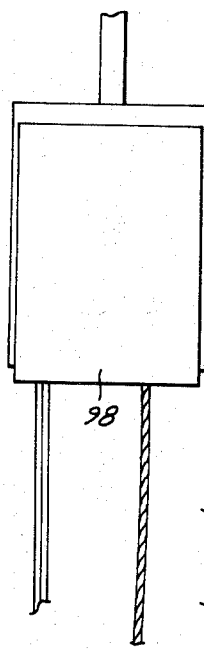
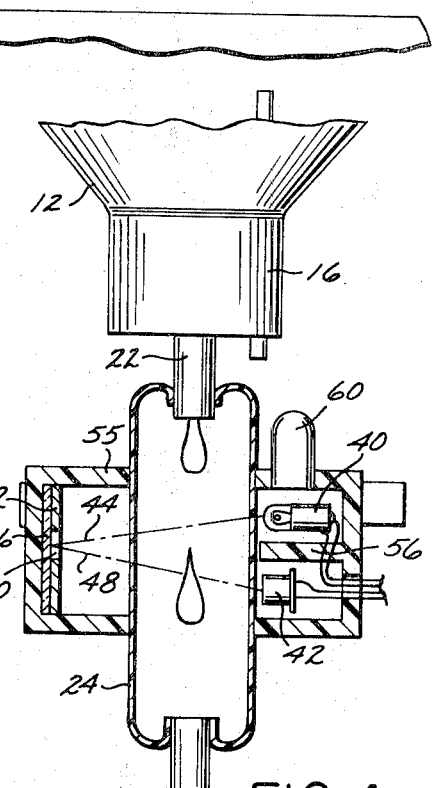
FIG.4
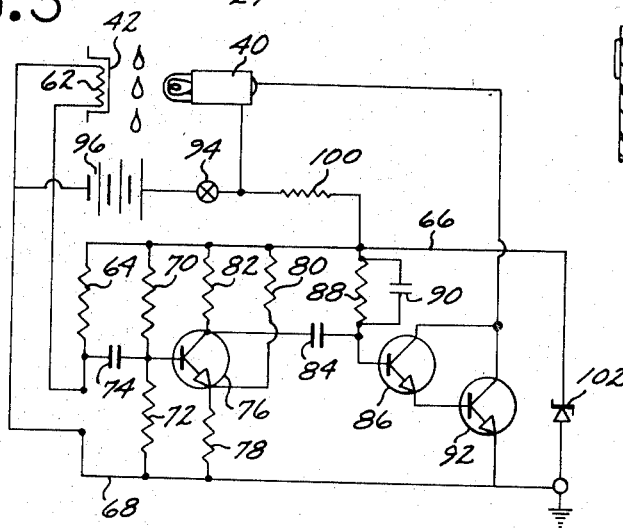
FIG.3
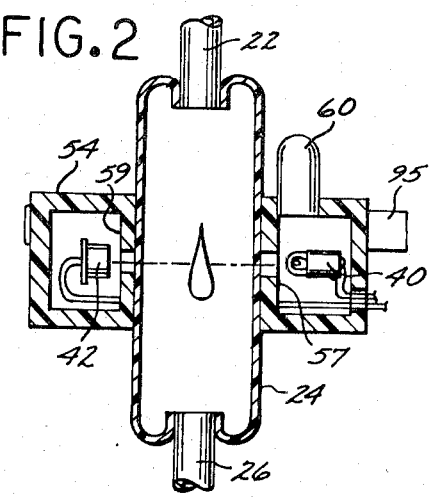
FIG.2
INVENTOR.
BASIL V. DELTOUR
BY
ATTORNEY United States Patent Office 3,563,090
Patented Feb. 16, 1971

3,563,090
DROP MONITOR
Basil V. Deltour, 12352 Zig Zag Way,
Tustin, Calif. 92680
Filed Sept. 18, 1968, Ser. No. 760,550
Int. Cl. G01f 3/00
U.S. Cl. 73—194    11 Claims

ABSTRACT OF THE DISCLOSURE

This application relates to methods and apparatus for monitoring the drop by drop flow of fluid and it is described, in the specification, particularly in relation to the monitoring of flow in an intravenous feeding or injection set. Fluid flow is reduced to a succession of drops through a distance along a free-fall path. As successive drops fall past a sensing point in that path, a signal is initiated and is made to endure for a period longer than the period required for the drop to pass the sensing point. An electro-optical sensing and indicating system is shown in which the presence of a drop at the sensing point modifies the quantity of light reaching a light sensitive sensor from a source. Sensitivity and response of the system is enhanced by employing controlled regeneration or positive feedback.

---

This invention relates to methods and means for monitoring the drop by drop flow of a fluid. More particularly, it relates to a method by which the operation of apparatus which accomplishes intravenous injection drop by drop from a fluid source can be monitored to determine whether or not the apparatus is functioning at all and, if functioning, whether the drop rate is proper. It relates also to apparatus by which the method may be practiced. Both the method and the means provided by the invention have broader application and are not limited to the intravenous injection of fluids. However, the invention is so well adapted for that application, and fulfills a need which is so acute in that application, that it is described and defined in that context. Intravenous injection of fluid over a protracted period is customarily accomplished by reducing flow to a succession of drop sized quantities and this is normally done by releasing the fluid from its container as a series of discrete drops. The fluid is placed in a container which is then inverted so that its only opening extends downwardly. A delivery conduit extends from the container opening to a point at lower elevation where the fluid is to be injected. The conduit terminates in a hollow needle which is inserted in a vein of the person to whom fluid is to be supplied. The ullage space being sealed, fluid is prevented from free-flow out the conduit by resistance in the conduit and the pressure at its outlet. Another conduit extending from the atmosphere through the opening up into the ullage space of the fluid container, allows free passage of air into the ullage space to permit flow of fluid through the delivery conduit.

At some point along its length the output or delivery conduit is enlarged and is made transparent so that the drops of emerging fluid free fall through some distance and so that their falling may be observed and the drop rate counted. The rate of flow from such an apparatus is measured in units of drops per unit time, a number of drops being a measure of volume. This can be done by watching a time piece and the drops simultaneously. Even in the daytime or in a lighted room these tests require a substantial amount of concentration if flow is to be determined accurately. At night in a darkened room, artificial light is required to locate the apparatus, to illuminate the drop observation tube, and to illuminate the time piece. Light may also be needed to avoid collision with other apparatus beside a patient's bed. In this circumstance the task of making accurate measurements is difficult and the patient, or other person being supplied with the fluid, may be disturbed.

It is an object of the invention to provide a method and a means for making it possible to measure flow rate more conveniently, more rapidly and without the need for flashlights or other artificial lighting of a character likely to provide unwanted and disturbing illumination. Another object of the invention is to provide an apparatus by which the drop rate through an intravenous injection set may be countered from a substantial distance and/or monitored at a remote location.

Another object of the invention is to provide an electronic drop monitor effective to signal the occurrence of drops of fluid, even clear fluid, to provide a readily discernible signal, which is simple to construct and is otherwise economically producable, and which requires minimum power making battery operation and portable operation practical. These and other objects and advantages of the invention which will hereinafter appear that its only opening extends downwardly. A delievry are realized in part by the provision of a method in which the fluid whose flow is to be measured is caused to flow in the form of discrete fluid drops free falling through space in succession, by causing a signal to be initiated each time a point in the path or free fall of said drops is passed by a drop, and by causing that signal to extend over a time period longer than the time required for a drop to traverse said point and shorter than the time interval between successive drops. Further, certain of the objects and advantages of the invention are realized in part by the provision of means for restricting the flow of a fluid to a succession of drops and for causing the said drops to fall through space past a point, by the provision of an electrically powered light source and means for normally connecting said light source to a source of electrical power, and by provision of interruption means responsive to fall of a drop past said point for interrupting the flow of electrical power to said light source for a selected time exceeding the time required for the drop to traverse said point.

Various modifications of the method are possible and the structures provided by the invention may be embodied in various forms. Preferred modifications and forms have been selected for detailed description in the specification which follows and for illustration in the accompanying drawings but the invention is not to be considered as being limited to them. Instead, the invention is to be considered limited only by the scope and spirit of the appended claims.

In the drawings:

FIG. 1 is an isometric view of an intravenous injection set and drop monitoring apparatus embodying the invention and suitable for use in practicing the method of the invention;

FIG. 2 is a schematic drawing of a portion of the intravenous feeding set including a drop observation tube and a transducer by which the free fall of fluid drops is monitored;

FIG. 3 is a schematic circuit diagram of electronic circuitry employed in the apparatus of FIG. 1 for monitoring the falling of fluid drops; and FIG. 4 is a schematic drawing of an alternative form of drop monitor tansducer shown in association with a drop chamber.

Referring to FIG. 1 of the drawing, the intravenous feeding set there shown is generally designated by the numeral 10. It comprises a fluid container 12, an end closure 16 for the container, an air inlet tube 18 for introducing air into ullage space of the fluid container, an outlet flow tube 22, a drop chamber or drop observation chamber 24, a flexible outlet delivery tube 26, a variable clamp 27 for regulating flow rate, an intravenous injection needle 30 and a coupling member 28 to couple the needle to the flexible tube 26. The purpose of this apparatus is to transfer fluid from the fluid container 12 to a vein of a patient or subject via the tube 26 and needle 30. The rate of flow is very slow. Fluid is withdrawn from the fluid container 12 drop by drop.

In operation, the fluid container 12 is inverted so that it has the orientation depicted. It is hung in this fashion from a support generally designated 32 by a bail handle 34 the ends of which are secured in a strap 36 which encompasses the fluid container and is disposed in a recess formed in the outer periphery of the container adjacent the end wall 38 of the latter.

Advantageously the fluid container 12 is formed of a transparent material. The material shown in the embodiment illustrated is glass and this material is now preferred. A series of graduations are formed on the outer wall of the container 12 to aid in the determination of how much fluid has been permitted to flow from the container. The range of the scale is appropriate to the volume of the container and the scale is fixed upon the side wall so that the volume of the container above the uppermost mark is equal to the interior volume of the container below the lowermost mark of the scale. To fill the container it is inverted and the closure 16 is removed. The container is then filled with fluid to a selected level. For example, container 12 of FIG. 1 might be filled to the 400 mark level. Closure 16 is then replaced upon the mouth of the container, the outlet tube 22 is inserted in an opening in the closure which is provided and adapted to receive it, and the container is inverted to the position shown in FIG. 1. In this inverted position, the fluid level will be even with the zero level mark of the scale. As fluid is withdrawn its level is lowered past each successive graduation mark of the scale to indicate the volume of fluid that has been removed. In practice, containers are filled and sealed at a manufacturing laboratory.

Fluid is prevented from running out of the container 12 through the tube 22 and tube 26 by the adjustable clamp and the air pressure, or blood pressure, at the outlet end of the needle 30. Withdrawal of fluid from the container to lower the liquid level increases the volume of the ullage space thus reducing its pressure and preventing withdrawal of fluid against air pressure at the end of needle 30 unless air pressure in the ullage space is increased by the admission of ambient air through the air inlet tube 18. Additional control of flow rate is accomplished by providing a restriction within the outlet tube 22 so that the forces of surface tension will act to limit the flow rate. Whether the metering be accomplished in tube 18, in tube 22, or in both tubes, some means is provided for limiting the flow rate from the container 12 so that the flow from the lower end of tube 22 into the observation tube 24 is confined to a succession of fluid drops at a selected drop rate. The drops flow through tube 26 and through coupling 28 to needle 30 from whence they are discharged into the bloodstream of the subject.

The essential feature of the system thus far described, or of any other system in which the drop rate is to be monitored, is that fluid drops be permitted to form and to free fall through some distance. The volume of fluid within each drop is a function of various physical characteristics of the fluid but for any given fluid each drop will contain substantially the same quantity of fluid as every other drop. Accordingly, the flow rate of fluid may be determined with reasonable accuracy by counting the number of drops that fall per unit time to the outlet tube 26. The drop rate may be determined by counting, for a known period of time, the number of drops that fall past an observation point in the path through which the drops fall. Thus drop rate can be determined by simultaneously watching the falling of drops and a timepiece. An accurate count requires some concentration and at night or in a darkened room it requires illumination both of the timepiece and of the drop observation tube. One reason that some persons may have difficulty in counting is that the drop fall rapidly so that the opportunity to observe a drop falling is limited to a very short space of time. At higher drop rates constant observation and high degree of concentration is required. In the invention, this problem is solved by the steps of initiating a signal as the drop falls past a point along the distance through which it freefalls and by continuing that signal for a period of time longer than the time required for the drop to pass that point. The duration of the signal must not be so long as to extend to the time when the succeeding drop passes the observation point. Accordingly, in the method of the invention the signal is terminated prior to arrival of the succeeding drop past that point in the free fall path of the fluid drops. Lest the duration of the time between successive signals become so short as to be difficult to observe, the method is adjusted, in its preferred form, so that the duration of the signal does not exceed half of the time period between the passage of successive drops past the measuring point. Then the signal time does not exceed the no-signal time.

The drops of fluid have several physical characteristics which may be sensed and which make possible the use of apparatus for automatically practicing some steps in the method of the invention. Thus, for example, the fluid drop has electrical characteristics, in particular a dielectric constant, different from that of air. Also, it has optical characteristics, such as reflectivity and transparency, which differ from that of air. In the invention means are provided for sensing the presence of a drop at a point along the length of the free fall drop path and for providing a signal in response to arrival of a drop at that point. In the preferred embodiment of the invention it is the optical characteristics of the drop that are utilized to determine its presence or absence at the measuring point. Means are provided for beaming light emanations through the measuring point and for measuring the amount of light that arrives at a light sensitive structure positioned to receive light after it passes through the measuring point. Referring to FIG. 2 of the drawing this is accomplished in a preferred embodiment by employing a light source, a lamp 40, positioned adjacent the exterior of the drop observation tube 24 so that light from the lamp passes through the path of free fall of drops being discharged from the outlet tube 22. In this preferred embodiment the means sensitive to the quantity of light that passes through that path comprises a photoresistive cell 42. This device functions as an electrical resistance and the value of its resistance varies in accordance with the amount of light impinging upon the active surface of the cell. Alternative arrangements are possible. Thus, the light source 40 might be mounted at one side of the observation tube 24 and the photoresistive cell may be mounted upon the opposite side of the observation tube. This arrangement is now preferred and is illustrated in the schematic diagram of FIG. 2. The housing 54 is made so that it extends partly around the drop chamber 24 and is held in position on the drop chamber by a fastening 95. The light source 40 is mounted at one side of the drop chamber and the photoresistive cell 42 is mounted at a diametric point in a position to receive light from source 40. Means are provided for limiting the light input to cell 43 to rays which arrive directly from the source 40. This means is representative by conformations 57 and 59 of housing 54. The means 57 restricts the light output of source 40 to a beam directed towards the photoresistive cell 42. The means 59 serves to shield the cell 42 from all but light originating at source 40. Housing 54 is oriented so that the light path from source 40 to cell 42 intersects the path along which fluid drops fall through the drop chamber 24 from inlet tube 22 to the outlet tube 26. As explained more fully below, source 40 is normally illuminated. Illumination is interrupted each time a fluid drop falls past the monitoring point and impedes the flow of light from the source to the cell 42. A plastic lens 60 is disposed in an aperture through the housing 54 adjacent the source 40. The plastic lens is illuminated, and is visible at the exterior of the housing, whenever source 40 is illuminated.

In the case of clear fluids, the falling of a drop past the measuring point does not entirely interrupt the passage of light from the light source 40 to the cell 42. However, because of reflection from the surface of the drop and because the light tends to be dispersed by the drop, or because the passage of light is impeded by the lower transparency of the fluid in the drop, a lesser quantity of light reaches the cell 42 when a drop passes the observation point.

An alternative arrangement of the light source and photoresistive cell, useful in certain applications of the invention, is shown in FIG. 4. In this embodiment the light source 40 and the photoresistive cell 42 are on the same side of the observation tube 24 and reflect light from the source to the cell with a mirror positioned on the opposite side of the observation tube. By masking all but selective portions of the mirrored surface, extraneous light, light other than that which passes through the observation point, may be kept from reaching the photoresistive cell 42. In FIG. 4 of the drawing, the light source 40 is shown to occupy a position vertically above the cell 42. This arrangement is satisfactory when the mirror position is such that the light lines are cut only once by each falling drop. Difficulty of this area may be avoided by mounting the light and the light sensitive cell at the same horizontal level. The showing in FIG. 4 being schematic, is intended to represent these two arrangements or any intermediate orientation of the cell and light source.

Means are provided for sensing the variation in resistance that is experienced by the cell 42. In the arrangement shown in FIG. 4, the passage of light from the source 40 to the cell 42 is impeded only for that period of time during which the drop is passing the measuring point. The length of this time is a function of drop velocity which in turn is determined by distance of the measuring point from the end of the tube 22 from whence the drop falls. It is also a function of the width of the light beam that is interrupted by the drop. In FIG. 4 the period of light interruption begins when the drop first intersects the beam 44 from the lamp 40 to the mirror 46 and it ends when the tail end of the drop passes below the beam 48 between mirror 46 and the solar cell 42. In other words the "point" of observation has length equal to the distance between the outgoing and return light paths represented in FIG. 2 by lines 44 and 48. If the cell 42 and light 40 are mounted at the same horizontal level then the "point" of observation and the period of light interruption will be shortened. To some extent the dimensions of the light beam are controlled by the effective size of the mirror 46 and this is controlled by the size of the aperture 50 in the light mask 52 which is disposed in front of the mirror 46 at the left end of the housing 55 for this optical system. Means represented by the light shield partition 56 at the right end of the optical housing 55 precludes light from the source 40 from shining directly on the sensitive face of the light cell 42. In any event, the time for passage of a drop past the point in its free-fall path is relatively short and a signal lasting only for that time period may be very difficult to detect. Accordingly, means are provided in the invention for developing a signal which commences at first interruption of the light beam by a drop and which ends at some time following the end of that interruption. Selection of an appropriate means for extending the duration of the signal depends in part upon the character of the signal to be generated. The form of the signal that is most suitable depends upon the application of the invention. When it is employed to monitor the proper operation and flow rate in an intravenous feeding or injection set, a visual signal is most desirable. Such a signal need not disturb the patient and it can be observed at a distance. Thus, in the preferred form of the invention, the variation in resistance at the photoresistive cell 42 is made to modulate a light source. The fact that power is required to generate a light and the fact that intravenous injection and feeding sets are advantageously made readily portable makes it desirable that the optical signal be produced with a minimum consumption of power. To this end, in the preferred form of the invention, the means for providing a signal as an incident to change in resistivity of the photoresistive cell 42 employs the same light source 40 which is utilized in the drop sensing mechanism for providing the operating or monitoring signal. As in the case of housing 55 of FIG. 2, housing 56 is provided with an aperture through its wall adjacent the position of the light source 40 so that emanations from the source will be visible through the housing. The plastic light conductor and filter 60 is disposed in the housing aperture so that one end extends into the housing to intercept light from the source and so that its other end extends without the housing and radiates light when the source 40 is illuminated.

Electronic circuitry suitable for interrelating the photoresistive cell and the light source 40 so that the latter will also serve as he signalling device is shown in FIG. 3. Electrically the photoresistive cell 42 comprises a two terminal resistor 62 which is connected in series with a resistor 64 between a positive bus line 66 and a negative bus or ground line 68 with resistor 62 toward the negative bus. A second pair of resistors 70 and 72 is connected in series circuit from positive bus 66 to negative bus 68. A DC coupling capacitor 74 is connected between the junction of resistors 62 and 64 and the junction of resistors 70 and 72. The latter junction is connected to the base of a transistor 76 whose emitter is connected through a resistor 78 to negative line 68 and through a resistor 80 to the positive bus 66. The collector of transistor 76 is connected through a resistor 82 to the positive bus 66. The collector is also connected through a series coupling capacitor 84 to the base of a second transistor 86. The base of this second transistor is connected to the positive bus 66 through a timing circuit comprising the parallel combination of a resistor 88 and capacitor 90. The emitter of transistor 86 is connected to the base of a third transistor 92. The emitter of the third transistor is connected to the negaive bus 68. The collectors of transistors 86 and 92 are connected to one another and to the positive bus 66. The light source 40, which comprises a two terminal lamp, is connected in series with the collector and emitter of the third transistor 92. In the embodiment shown the lamp 40 is connected in series with the line extending from the collectors of the second and third transistors to the positive side of source 96 through off-on switch 94. Positive bus 66 is connected through switch 94 and a limiting resistor 100 to the positive terminal of battery 96 or equivalent source of a unidirection voltage having potential to light the lamp 40 and to power the several transistors. The negative side of the power source 96 is connected to the negative bus line 68 through a ground return system. To insure uniformity in supply voltage magnitudes a Zener diode 102 is connected between the positive bus 66 and negative bus 68.

Returning to FIG. 1 of the drawing, the transistors and other electronic circuitry is advantageously housed in a separate housing such as the housing 98 which may also include the power source 96. This housing is interconnected with the transducer housing 54 by an electrical cable 100 containing the lamp power, light cell and ground return lines.

The resistance of cell 42 varies inversely with the quantity of light inpinging upon its active surface. Accordingly, when light flow to the cell is interrupted or reduced the resistance of resistor 62 is increased and current flow through series combination of resistors 64 and 66 is modified with the result that the voltage at their junction and at the left side of capacitor 74 is rendered more positive relative to the right side of that capacitor at the junction between resistors 70 and 72. Current flow in the voltage divider comprised of resistors 70 and 72 is modified to permit charging of capacitor 74 from an initial value, which is just enough to bias the first transistor 76 into the conduction region of its characteristic curve, to a value of bias at the base of the transistor which increases conduction through transistor 76 rending its collector, the negative end of resistor 82, more negative.

The voltage change at this point is coupled through the coupling capacitor 84 to the base of the second transistor 86. The base of transistor 86 is biased so that this transistor applies to the base of transistor 92 a bias which causes transistor 92 to conduct current at saturation level. When the collector of transistor 76 is driven in the negative direction, the voltage drop change which is coupled to the base of transistor 86 is manifested as a change in voltage across capacitor 84 which results in an alteration in the rate of flow through the resistor 88 of the time delay circuit 88–90. The current change through resistor 88 results in a voltage change across that resistor and at the base of transistor 86 which tends to diminish conduction through transistors 86 and 92. A diminution in conduction through transistor 92 results in a reduction in the power applied to the light source 40 and a reduction in the quantity of light emitted by the source. Such a diminution in the light output of the lamp results in even less light arriving at the photosensitive cell 42 with a consequent further increase in the resistance of resistor 62. By the process previously described this results ultimately in the further biasing of transistor 92 to result in further diminution of the current that flows through the transistor. This, in turn, means even less light output from the lamp 40. The result is a positive feedback or regeneration that is effective to extinguish the lamp 40 very rapidly even though the drop which initiated the action by passing through the light beam was transparent and had a minimum effect on the quantity of light reaching the light cell. When the drop has fallen to a position at which it no longer interferes with the passage of light from the lamp 40 to the cell 42, there is no light to illuminate the cell. The resistance of the latter remains high and conduction in transistor 92 remains cut off.

However, modification of the current through resistor 88 resulted in a change in voltage across the resistor. Part of that voltage change resulted from a modification of current in resistor 88 to permit current flow into capacitor 90. The resistor and capacitor being connected in parallel, change in the voltage across one is possible only when the voltage across the other changes correspondingly. When the resistance of resistor 62 stops changing and capacitor 84 is charged to a new value so that the current flow in this capacitor has stopped, capacitor 90 will discharge through resistor 88 at a rate determined by their respective values. That is, the bias voltage appearing at the base of the second transistor, 86, will be returned to initial condition at the end of a time determined by the time constant of the timing circuit 88–90. As this condition is approached, the bias at transistor 86 is changed, and the bias at the base of transistor 92 is changed, so that transistor 92 begins to turn on and to apply power to the light source 40. The drop having passed beyond the line at which there is interference with the passage of light from the light source to the cell 42, any energization of the light source resulting in emission of light will result in a reduction in the resistance of the light cell 42. Reduction of its resistance 62 results in a decrease of voltage at the junction point between resistors 62 and 64 and the action of the electronic circuit is reversed. In a reversal of the operation previously described, the bias at the base of transistor 86 is altered in a direction that renders transistor 92 more conductive whereby a greater quantity of light is emanated from the lamp 40. This results in further reduction of the resistance 62 of the light cell 42. Thus the same circuit which experienced positive feedback to extinguish the light upon the passage of a drop past the detection point is effective without modification or alteration to apply positive feedback to return the lamp to full illumination at the level of saturation current in transistor 92. Thus, it is seen that a single lamp 40 serves not only as a source of illumination to detect the presence of a drop but it serves as well to provide the signal by which proper operation is indicated and by which the drop rate is signaled.

What is claimed is:

1. The method of monitoring operation of apparatus for accomplishing fluid flow drop by drop from a fluid source comprising the steps of:

causing a flow of fluid in the form of discrete fluid drops free falling through space in succession at selected intervals;

initiating a signal each time a point in the path of free fall of said drops is passed by a drop;

causing said signal to continue for a time period longer than the time required for a drop to traverse said point and shorter than the time interval between successive drops; and in which light is caused to emanate from a source, in which the step of initiating a signal comprises interrupting the emanations from said light source each time a point in the path of free fall of said drops is passed by a drop, and in which the step of causing the signal to continue comprises continuance of interruption of such emanations for said time period.

2. The invention defined in claim 1, in which said emanations of light are interrupted, on the occasion of a drop passing said point, for a period less than half of the duration of the interval between successive drops at a maximum rate.

3. Apparatus for monitoring the flow in the form of a succession of drops of fluid, comprising in combination:

(a) means for restricting flow of fluid to a succession of drops and for causing said drops to fall through a space past a point;

(b) an electrically powered light source and means for normally connecting said light source to a source of electrical power;

(c) interruption means responsive to fall of a drop past said point for interrupting the flow of electrical power to said light source for a selected period exceeding the time required for said drop to traverse said point.

4. The invention defined in claim 3, in which said interruption means comprises light sensitive means responsive to light from said light source and means for interrupting the flow of light from said light source to said light sensitive means as an incident of the falling of drops past said point.

5. The invention defined in claim 4 in which said interruption means includes means for regenerating interruption of light flow from said light source to said means sensitive to light from said source including means sensitive to diminution of light flow to said light responsive means for effecting further diminution of light flow to said light sensitive means.

6. The invention defined in claim 5 in which said interruption means further comprises means effective following diminution of said light flow and said selected period for restoring light flow and including means sensitive to restoration of light flow to effect further restoration of light flow.

7. The invention defined in claim 6, in which said means for regenerating interruption of light flow and said means for effecting further restoration of light flow comprises a photoresistive device having resistance variable with the intensity of the light emanating from said light source.

8. The invention defined in claim 3, in which said interruption means comprises a photoresistive cell positioned to receive light from said electrically powered light source in the absence of a drop of fluid and to receive a lesser quantity of light from said light source upon the passage of a fluid drop past said point;

said interruption means further comprising means responsive to a reduction in the amount of light received by said photoresistive cell from said electrically powered light source for diminishing the electrical power applied to said light source and the quantity of light emanating therefrom whereby to diminish the quantity of light emanating from said light source by regeneration;

means effective after a selected time delay following diminution of the light emanating from said light source for increasing the quantity of electrical power applied to said light source including means sensitive to the receipt of light from said light source by said photoresistive cell for increasing the power applied to said light source.

9. The invention defined in claim 3, in which said electrically powered light source emits light in proportion to the degree of its electrical energization;

and in which said interruption means is effective to alter the degree of energization of said electrically powered light source and is comprised of a photoresistive cell positioned to receive light from said electrically powered light source in a degree which is diminished upon the passage of a drop past said point;

voltage sensitive means for connection in circuit with said source of electrical power and said electrically powered light source for controlling the degree in which power is applied to said light source;

means responsive to increase in the resistance of said photoresistive cell for applying to said voltage sensitive means a voltage tending to render said voltage sensitive means effective to diminish the power applied to said light source and sensitive to a diminution in the resistance of said photoresistive cell for applying to said voltage sensitive means a voltage tending to render said voltage sensitive means effective to increase the quantity of power delivered to said light source.

10. The invention defined in claim 9, including time delay means sensitive to application to said voltage sensitive means of a voltage tending to diminish the amount of power applied to said electrically powered light source for continuing application to said voltage sensitive means, for a preselected period, of a voltage tending to prevent application of electrical power to said electrically powered light source.

11. The invention defined in claim 3, in which said electrically powered light source is effective to emit light as a function of the quantity of electrical power applied thereto and in which said interruption means comprises a photoresistive cell positioned to receive light from said light source in a degree which is diminished when a drop falls past said point; a first electronic amplifier for connection across a power source from a first power line to a second power line comprising a first voltage divider including a first resistor and said photoresistive cell connected in series from said first to said second power line; a second voltage divider comprising first and second resistors connected from said first to said second power line; a DC blocking capacitor interconnecting the connection between the resistor and cell of said first voltage divider with the connection between said resistors of said second voltage divider; a first transistor having its base connected to the junction of the resistors of said second voltage divider; a third voltage divider comprising a first and second resistor connected in series from said first to said second power line the emitter of said first transistor being connected to the junction between said first and second resistors of said third voltage divider; a resistor connected from the collector of said first transistor to said first power line; a second transistor; a coupling capacitor connected from the collector of said first transistor to the base of said second transistor; the parallel combination of a resistor and a capacitor connected from the base of said second transistor to said first power line; a third transistor having its base connected to the emitter of said second transistor and having its emitter connected to said second power line; said third transistor having its collector connected to the collector of said second transistor and to said first power line; said electrically powered light source being connected in series with the emitter and collector of said third transistor.

References Cited
UNITED STATES PATENTS

| | | | |
|---|---|---|---|
| 2,333,791 | 11/1943 | Hutchison | 73—194 |
| 2,880,764 | 4/1959 | Pelavin | 73—194X |
| 2,967,450 | 1/1961 | Shields et al. | 73—199 |
| 3,197,068 | 7/1965 | Corbin et al. | 222—59 |
| 3,390,577 | 7/1968 | Phelps et al. | 73—194 |

OTHER REFERENCES

Ellenwood, E. R., Drop Detector, 12 (5) IBM Technical Disclosure Bulletin 693, October 1969.

RICHARD C. QUEISSER, Primary Examiner

LUNSFORD, Assistant Examiner

U.S. Cl. X.R.

222—76